United States Patent
Gati

(10) Patent No.: US 7,320,564 B2
(45) Date of Patent: Jan. 22, 2008

(54) CUTTING INSERT FOR GROOVING OPERATIONS

(75) Inventor: Uzi Gati, Karmiel (IL)

(73) Assignee: Iscar Ltd., Tefen (IL)

( * ) Notice: Subject to any disclaimer, the term of this patent is extended or adjusted under 35 U.S.C. 154(b) by 23 days.

(21) Appl. No.: 10/965,724

(22) Filed: Oct. 18, 2004

(65) Prior Publication Data

US 2005/0123367 A1 Jun. 9, 2005

(30) Foreign Application Priority Data

Dec. 4, 2003 (IL) .......................... 159188

(51) Int. Cl.
*B23B 27/22* (2006.01)
(52) U.S. Cl. .................. 407/114; 407/115; 407/117
(58) Field of Classification Search ............. 407/113, 407/114, 115, 116, 117
See application file for complete search history.

(56) References Cited

U.S. PATENT DOCUMENTS

| 4,212,568 | A | * | 7/1980 | Minicozzi ............. 407/53 |
| 4,629,372 | A | * | 12/1986 | Huston ............... 407/116 |
| 4,969,779 | A | * | 11/1990 | Barten ............... 407/114 |
| D330,381 | S | * | 10/1992 | Gustafsson et al. ...... D15/139 |
| 5,232,319 | A | * | 8/1993 | Satran et al. ........... 407/114 |
| 5,688,081 | A | | 11/1997 | Paya et al. |
| 5,772,366 | A | * | 6/1998 | Wiman et al. ........... 407/119 |
| 6,135,678 | A | | 10/2000 | Lundstroem et al. |
| 6,217,264 | B1 | * | 4/2001 | Kim et al. .............. 407/114 |
| 6,447,219 | B1 | | 9/2002 | Tagtstrom et al. |
| 6,692,199 | B2 | * | 2/2004 | Andersson et al. ........ 407/116 |
| 6,799,925 | B2 | * | 10/2004 | Ejderklint .............. 407/116 |

* cited by examiner

*Primary Examiner*—Willmon Fridie, Jr.
(74) *Attorney, Agent, or Firm*—Womble Carlyle

(57) ABSTRACT

A cutting insert for grooving operations having a forward main cutting edge and two opposing side cutting edges extending rearwardly and outwardly from the main cutting edge, each side cutting edge having a variable rake angle.

16 Claims, 3 Drawing Sheets

CUTTING INSERT FOR GROOVING OPERATIONS

FIELD OF THE INVENTION

The present invention relates to a cutting insert for grooving operations. In particular, the cutting insert in accordance with the present invention is intended primarily for the production of keystone shaped grooves, finding application in the machining of ring grooves in pistons.

BACKGROUND OF THE INVENTION

Such a cutting insert is known, for example, from U.S. Pat. No. 6,135,678 which discloses a cutting insert comprising a rear shank portion and a forward cutting head projecting forwardly from the rear shank portion. The cutting head includes a top side, an underside, two flank side surfaces each interconnecting the top side with the underside, and a forwardly facing front flank surface interconnecting the flank side surfaces. Each flank side surface forms an acute angle with the top side. A transition between the flank front surface and the top side forms a main cutting edge. A transition between each flank side surface and the top side forms a side cutting edge. The side cutting edges extend on respective opposite sides of a center line of the cutting head and converge in a forward direction. The side cutting edges form an acute angle between one another. Each side cutting edge includes a plurality of spaced-apart grooves formed therein, whereby each side cutting edge is non-continuous. Therefore, the cutting edge comprises cutting edge segments, each segment separated from an adjacent one by a groove.

During a grooving operation, first the main cutting edge engages the workpiece. As the cutting depth increases, the interaction between the insert and the workpiece occurs on three different sides, i.e. along the major cutting edge and the two side cutting edges at which point the grooves begin to play an active role and contribute to reducing the width of the chips. This helps to avoid the formation of chips which are too thin and difficult to handle. However, as the cutting depth increases, after a given cutting edge segment has completed machining the workpiece, a portion of the workpiece will engage the groove that is located immediately to the rear (i.e., downstream relative to the feed direction) of the given cutting edge segment. This will result in large forces of resistance being applied to the cutting insert, each time a further groove engages the workpiece. The grooves are not cutting edges and therefore as the cutting depth increases those parts of the workpiece engaging the grooves will not be cut, but at the best deformed. The whole machining process will therefore be very inefficient.

SUMMARY OF THE INVENTION

In accordance with the present invention there is provided a cutting insert for grooving operations comprising a clamping portion and at least one cutting portion, top and bottom opposing surfaces and a peripheral side surface extending therebetween, the top and peripheral side surfaces meeting at an upper edge at least a portion of which comprises a cutting edge, the cutting edge comprising a forward main cutting edge and two opposing side cutting edges extending rearwardly and outwardly from the main cutting edge to the clamping portion on opposing sides of a longitudinal axis of the cutting insert, at least a portion of each side cutting edge having a variable rake angle.

In accordance with one embodiment of the present invention, each side cutting edge comprises a plurality of cutting edge sections, the rake angle being constant within each cutting edge section.

Preferably, adjacent cutting edge sections have different rake angles.

In accordance with a preferred embodiment, the rake angles of adjacent cutting edge sections are alternately positive and negative.

If desired, the top surface has a stepped structure.

The cutting edge sections on each side cutting edge can appear in groups, each group comprising a plurality of cutting edge sections, the rake angles of the cutting edge sections in a first group all being positive, the rake angles of the cutting edge sections in an adjacent, second group all being negative.

BRIEF DESCRIPTION OF THE DRAWINGS

For a better understanding of the present invention and to show how the same may be carried out in practice, reference will now be made to the accompanying drawings, in which.

DETAILED DESCRIPTION OF A PREFERRED EMBODIMENT

Figure 2:
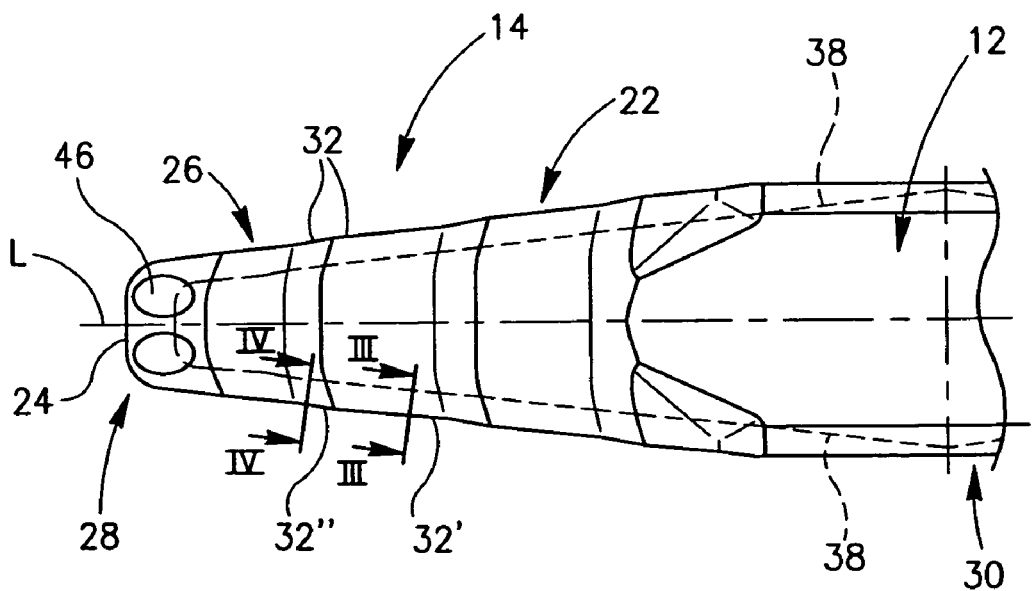
FIG. 2 is a partial top view of the cutting insert shown in FIG. 1.

Attention is drawn to the drawings showing a cutting insert 10 for grooving operations in accordance with the present invention. The cutting insert 10 is typically made of extremely hard and wear-resistant material such as cemented carbide, either by form-pressing or by injection molding and sintering carbide powders in a binder. The cutting insert 10 is an indexable double-ended cutting insert and comprises a clamping portion 12 and two cutting portions 14. However, the invention is equally applicable to single ended cutting inserts, having only one cutting portion 14. The cutting insert 10 has top and bottom opposing surfaces 16, 18 and a peripheral side surface 20 extending therebetween. The peripheral side surface 20 comprises an end flank 20' and two opposing side flanks 20". The top and peripheral side surfaces 16, 20 meet at an upper edge 22 comprising a forward main cutting edge 24, formed at the intersection of the end flank 20' with the top surface 16, and two opposing identical side cutting edges 26, formed at the intersection of the side flanks 20" with the top surface 16. The two opposing identical side cutting edges 26 extend rearwardly and outwardly from the main cutting edge 24 to the clamping portion 12 on opposite sides of a longitudinal axis L of the cutting insert 10. In other words, the two opposing identical side cutting edges 26 diverge rearwardly from the main cutting edge 24. This property can be seen in FIG. 2, showing a top view of the cutting insert 10. In accordance with the present invention, each side cutting edge 26 has a rake angle that varies along the length of the side cutting edge 26. The shape of a groove formed by the cutting insert 10 in a workpiece will be approximately keystone or wedge-like shape in cross section. Ring grooves having a keystone or wedge-like shape in cross section are required, e.g., in pistons.

Figure 5:
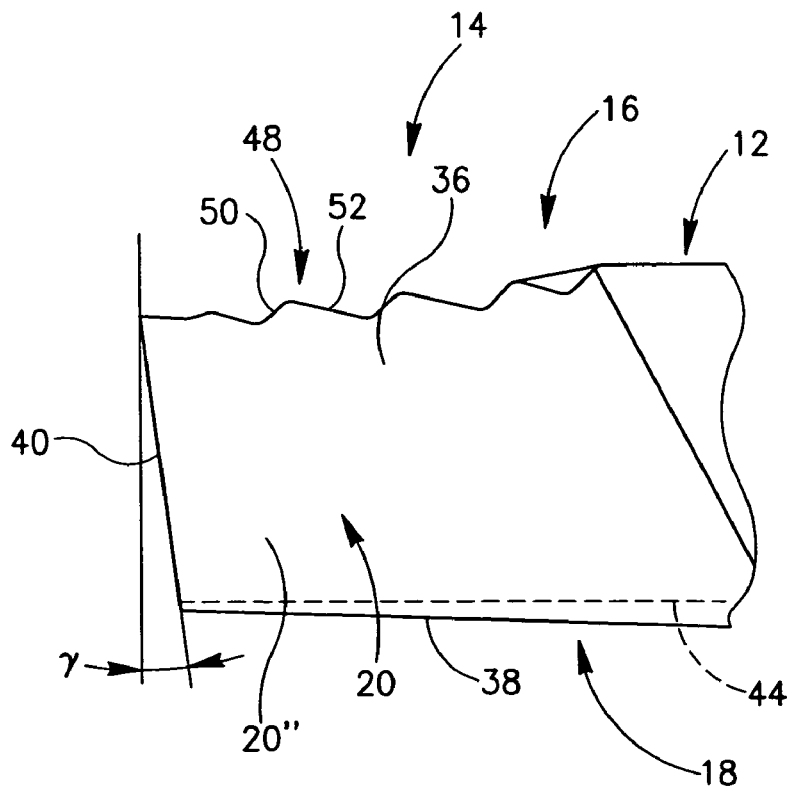
FIG. 5 is a partial side view of the cutting insert shown in FIG. 1.
Figure 6:
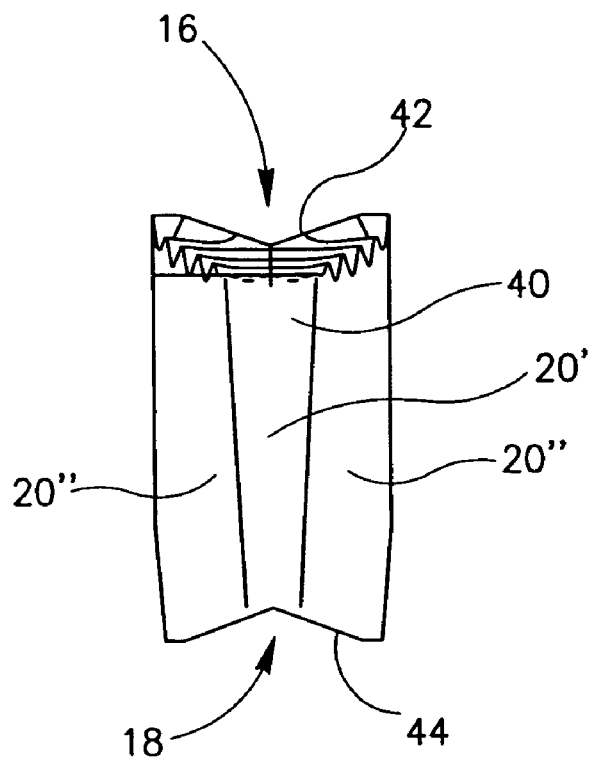
FIG. 6 is an end view of the cutting insert shown in FIG. 1.

In accordance with a preferred embodiment of the present invention, the two cutting portions 14 are identical and therefore it is sufficient to describe the double-ended cutting insert 10 with respect to half the cutting insert 10 as shown in FIGS. 2 and 5. The longitudinal axis L defines a forward to rear longitudinal direction of the cutting insert 10, with the main cutting edge 24 being located at the forward end 28 of the cutting insert 10 and the clamping portion 12 being located at the rear end 30 with respect to one half of the cutting insert 10, as shown in FIG. 2. As also seen in the top view of FIG. 2, the two opposing identical side cutting edges 26 increase in separation as they extend rearwardly from the main cutting edge 24 to the clamping portion 12 on opposing sides of the longitudinal axis L.

Figure 3:
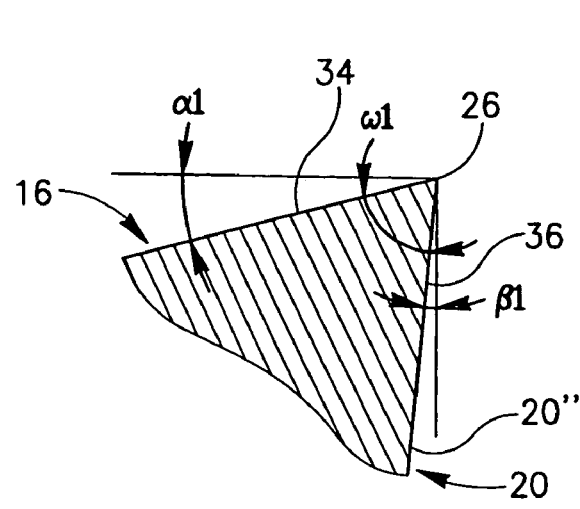
FIG. 3 is a cross section taken along the lines III-III in FIG. 2.
Figure 4:
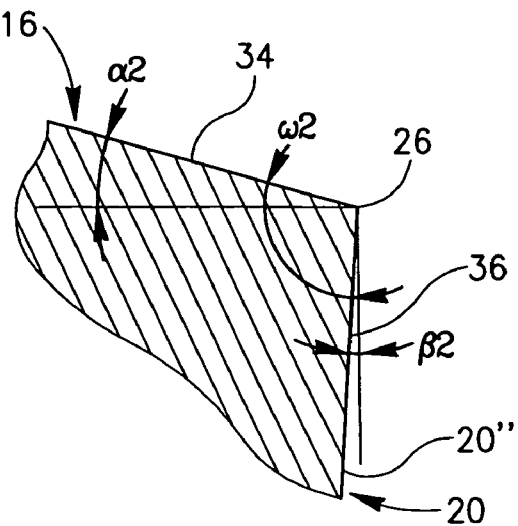
FIG. 4 is a cross section taken along the lines IV-IV in FIG. 2.

Each side cutting edge 26 comprises a plurality of cutting edge sections 32, the rake angle being constant within each cutting edge section 32. FIGS. 3 and 4 show the rake angles $\alpha 1$, $\alpha 2$ of two adjacent cutting edge sections 32', 32". In the embodiment shown, the rake angle $\alpha 1$ of one of the adjacent cutting edge section 32' is positive, whereas the rake angle $\alpha 2$ of the other adjacent cutting edge section 32" is negative. FIGS. 3 and 4 also show the side relief angles $\beta 1$, $\beta 2$ of the two adjacent cutting edge sections 32', 32". The present invention does not require that the side relief angle vary along the cutting edge 26. Therefore, if desired the side relief angle can be constant along the cutting edge. In such a case, the side relief angles $\beta 1$, $\beta 2$ of the two adjacent cutting edge sections 32', 32" will be equal ($\beta 1 = \beta 2 = \beta$). This may be obtained by grinding the side flanks 20". As shown in FIGS. 3 and 4, the top surface 16 and the side flanks 20" comprise, respectively, side rake and side relief surfaces 34, 36 adjacent the side cutting edges 26. Also shown in FIGS. 3 and 4 are the wedge angles $\omega 1$, 107 2 of the two adjacent cutting edge sections 32', 32". Clearly, if the side relief angle $\beta$ is constant along the side cutting edges 26, then any variation in the magnitude of the rake angle along the side cutting edges 26 will be equivalent to a variation in the magnitude of the wedge angle.

The variation in the magnitude of the rake angle along the side cutting edges 26 ensures that a chip removed from a workpiece during a grooving operation will be manageable. Such a chip comprises a central portion formed by the main cutting edge 24 and side portions formed by the side cutting edges 26. Due to the variation in the magnitude of the rake angle along the side cutting edges 26, the side portions will be acted upon by shear forces causing the side portions of the chips to become distorted. Generally, the side portions of the chips will break up into a collection of spaced apart minor chip side portions. The greater the variations in the magnitude of the rake angle between adjacent cutting edge portions, the greater the shear forces acting on the portions of the chips.

Figure 7:
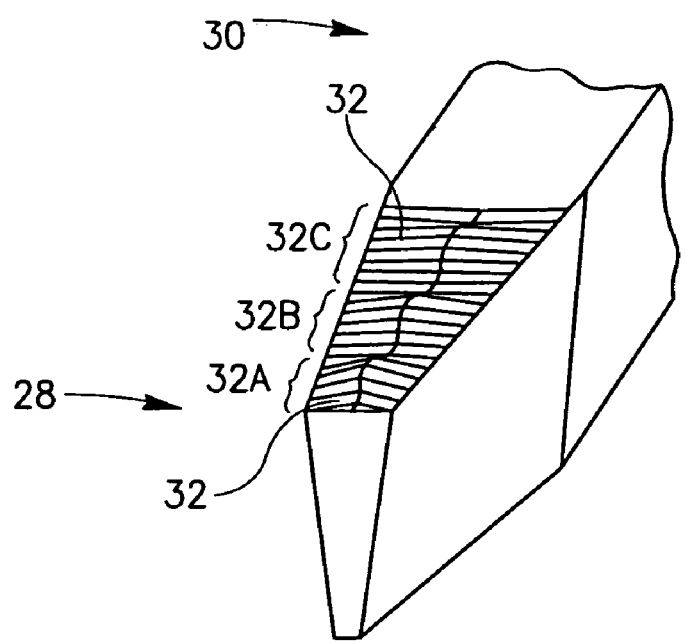
FIG. 7 is a partial perspective view of another cutting insert according to the present invention.

The greatest shear forces will be obtained with the greatest variations in the shape of the side rake surface 34 along the side cutting edge 26, which is obtained when the rake angles of adjacent cutting edge sections 32 are alternately positive and negative. However, gentler variations in the shape of the side rake surface 34 along the side cutting edge 26, as shown in FIG. 7, may also be used. In the embodiment shown in FIG. 7, the shape of the side rake surface 34 along the side cutting edge 26 is wavy in form. This is obtained by using relatively small cutting edge sections 32 (as measured along the side cutting edge 26). Starting from the forward end 28 of the cutting insert 10 and moving towards the rear end 30, there is a first group of cutting edge sections 32A in which all adjacent cutting edge sections 32 have positive rake angles, starting from an initial relatively small positive value, increasing to a maximum value, and then decreasing to the initial small positive value. Following this, there is a second group of cutting edge sections 32B in which all adjacent cutting edge sections 32 have negative rake angles, starting from an initial relatively small negative value, increasing to a maximum value, and then decreasing to the initial small negative value. A third group of cutting edge sections 32C is a repetition of the first group. This way an undulating wavy side rake surface 34 is obtained.

A bottom edge 38 of the cutting insert 10 is formed where the peripheral side surface 20 meets the bottom surface 18. As can be seen in FIG. 2, in a top view of the cutting insert 10, the bottom edge 38 (shown as a dashed hidden line) is located within the bounds of the upper edge 22 indicating that the peripheral side surface 20 extends downwardly and inwardly from the side cutting edge 26 to the bottom edge 38, ensuring that the cutting edge 26 is relieved from the workpiece during grooving operations. In addition to the side relief angle $\beta$, there is a front relief angle $\gamma$ associated with the front relief surface 40.

The top surface 16 in the vicinity of the clamping portion 12 and the bottom surface 18 have concave V-shaped abutment surfaces 42, 44 extending in the longitudinal direction. The clamping surfaces of an insert pocket of a tool holder (not shown) for retaining the cutting insert 10 will have mating longitudinally extending convex V-shaped surfaces. This arrangement is well known in the art for achieving lateral stability of the cutting insert during machining operations.

Figure 1:
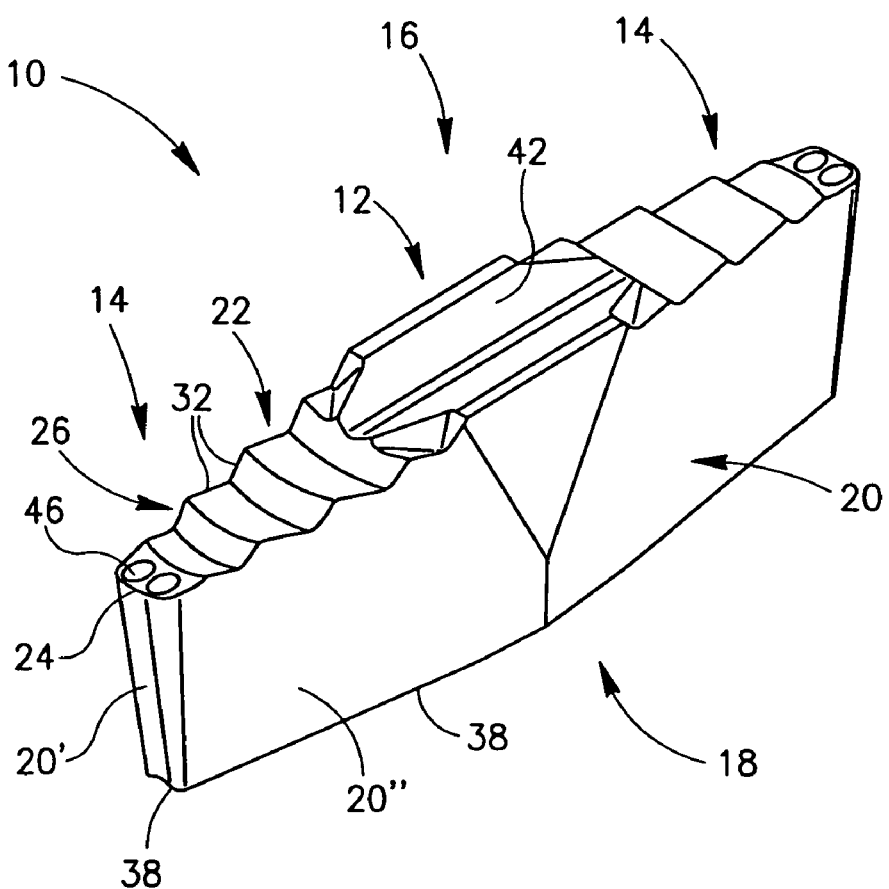
FIG. 1 is a perspective view of a cutting insert according to the present invention.

The top surface 16 may be provided with chip formers. FIGS. 1 and 2 show chip formers 46 adjacent the main cutting edge 24. The chip formers 46 may be of any desired form, for example, recesses in the top surface 16, or protrusions protruding from the top surface 16.

It can be seen in FIGS. 1 and 5 that the top surface 16 has a stepped structure, each step 48 comprising a forward portion 50, extending upwardly and away from the bottom surface 18, and a rear portion 52, extending downwardly from the forward portion 50 towards the bottom surface 18. The stepped structure reduces the cutting forces acting on the cutting insert 10 during grooving operations, thereby making grooving operations more efficient.

Although the present invention has been described to a certain degree of particularity, it should be understood that various alterations and modifications could be made without departing from the scope of the invention as hereinafter claimed.

The invention claimed is:

1. A grooving cutting insert comprising:
   a clamping portion and at least one cutting portion, top and bottom opposing surfaces and a peripheral side surface extending therebetween,
   the top and peripheral side surfaces meeting at an upper edge at least a portion of which comprises a cutting edge, the cutting edge comprising a forward main cutting edge and two opposing side cutting edges,
   in a top view of the insert, the two opposing side cutting edges increase in separation as they extend rearwardly from the main cutting edge to the clamping portion on opposing sides of a longitudinal axis of the cutting insert, at least a portion of each side cutting edge having a variable rake angle.

2. The grooving cutting insert according to claim 1, wherein each side cutting edge comprises a plurality of cutting edge sections, the rake angle being constant within each cutting edge section.

3. The grooving cutting insert according to claim 2, wherein adjacent cutting edge sections have different rake angles.

4. The grooving cutting insert according to claim 3, wherein the rake angles of adjacent cutting edge sections are alternately positive and negative.

5. The grooving cutting insert according to claim 4, wherein the top surface has a stepped structure.

6. The grooving cutting insert according to claim 2, wherein the cutting edge sections on each side cutting edge are arranged in groups, each group comprising a plurality of cutting edge sections, the rake angles of the cutting edge sections in a first group all being positive, the rake angles of the cutting edge sections in an adjacent, second group all being negative.

7. The grooving cutting insert according to claim 6, wherein the rake angles of adjacent cutting edge sections belonging to a single group are different from one another.

8. The grooving cutting insert according to claim 6, wherein the rake angles of adjacent cutting edge sections belonging to a single group increase in magnitude to a maximum value and then decrease in magnitude, along the side cutting edge.

9. A grooving cutting insert comprising:
a clamping portion and at least one cutting portion;
top and bottom opposing surfaces and a peripheral side surface extending therebetween;
the top and peripheral side surfaces meeting at an upper edge at least a portion of which comprises a cutting edge;
the cutting edge comprising a forward main cutting edge and two opposing side cutting edges;
the side cutting edges diverging rearwardly from the forward main cutting edge to the clamping portion on opposite sides of a longitudinal axis of the cutting insert such that, in a top view of the cutting insert, the at least one cutting portion is narrowest at the forward main cutting edge and increases in width in a direction towards the clamping portion;
at least a portion of each side cutting edge having a variable rake angle.

10. The grooving cutting insert according to claim 9, wherein each side cutting edge comprises a plurality of cutting edge sections, the rake angle being constant within each cutting edge section.

11. The grooving cutting insert according to claim 10, wherein adjacent cutting edge sections have different rake angles.

12. The grooving cutting insert according to claim 11, wherein the rake angles of adjacent cutting edge sections are alternately positive and negative.

13. The grooving cutting insert according to claim 12, wherein the top surface has a stepped structure.

14. The grooving cutting insert according to claim 10, wherein the cutting edge sections on each side cutting edge are arranged in groups, each group comprising a plurality of cutting edge sections, the rake angles of the cutting edge sections in a first group all being positive, the rake angles of the cutting edge sections in an adjacent, second group all being negative.

15. The grooving cutting insert according to claim 14, wherein the rake angles of adjacent cutting edge sections belonging to a single group are different from one another.

16. The grooving cutting insert according to claim 14, wherein the rake angles of adjacent cutting edge sections belonging to a single group increase in magnitude to a maximum value and then decrease in magnitude, along the side cutting edge.

* * * * *